United States Patent [19]

Kondo

[11] 4,214,794

[45] Jul. 29, 1980

[54] BRAKE PRESSURE CONTROL APPARATUS FOR SPLIT BRAKING SYSTEM

[75] Inventor: Hiroyuki Kondo, Anjo, Japan

[73] Assignee: Aisin Seiki Kabushiki Kaisha, Aichi, Japan

[21] Appl. No.: 937,586

[22] Filed: Aug. 28, 1978

[30] Foreign Application Priority Data

Sep. 1, 1977 [JP] Japan ............................ 52-105613

[51] Int. Cl.² .............................................. B60T 8/26
[52] U.S. Cl. ..................... 303/6 C; 188/349
[58] Field of Search ................ 303/6 C, 24 F, 24 C; 188/349

[56] References Cited

U.S. PATENT DOCUMENTS

| | | |
|---|---|---|
| 3,459,000 | 8/1969 | Oberthür ............................ 303/6 C |
| 3,697,138 | 10/1972 | Marting ............................ 303/6 C |
| 3,806,207 | 4/1974 | Reinecke et al. ............... 303/6 C X |

*Primary Examiner*—Douglas C. Butler
*Attorney, Agent, or Firm*—Oblon, Fisher, Spivak, McClelland & Maier

[57] ABSTRACT

A brake pressure control apparatus for a split braking system includes a pair of brake pressure proportioning control valve assemblies between separate fluid pressure sources and wheel cylinders for each of braking fluid lines. When one of separate sources relating to one of the proportioning control valve assemblies fails to operate, the other of the proportioning control valve assemblies is forced into its non-operating position so that the braking pressure is directly transmitted from the other fluid pressure source to the other of wheel cylinders.

6 Claims, 2 Drawing Figures

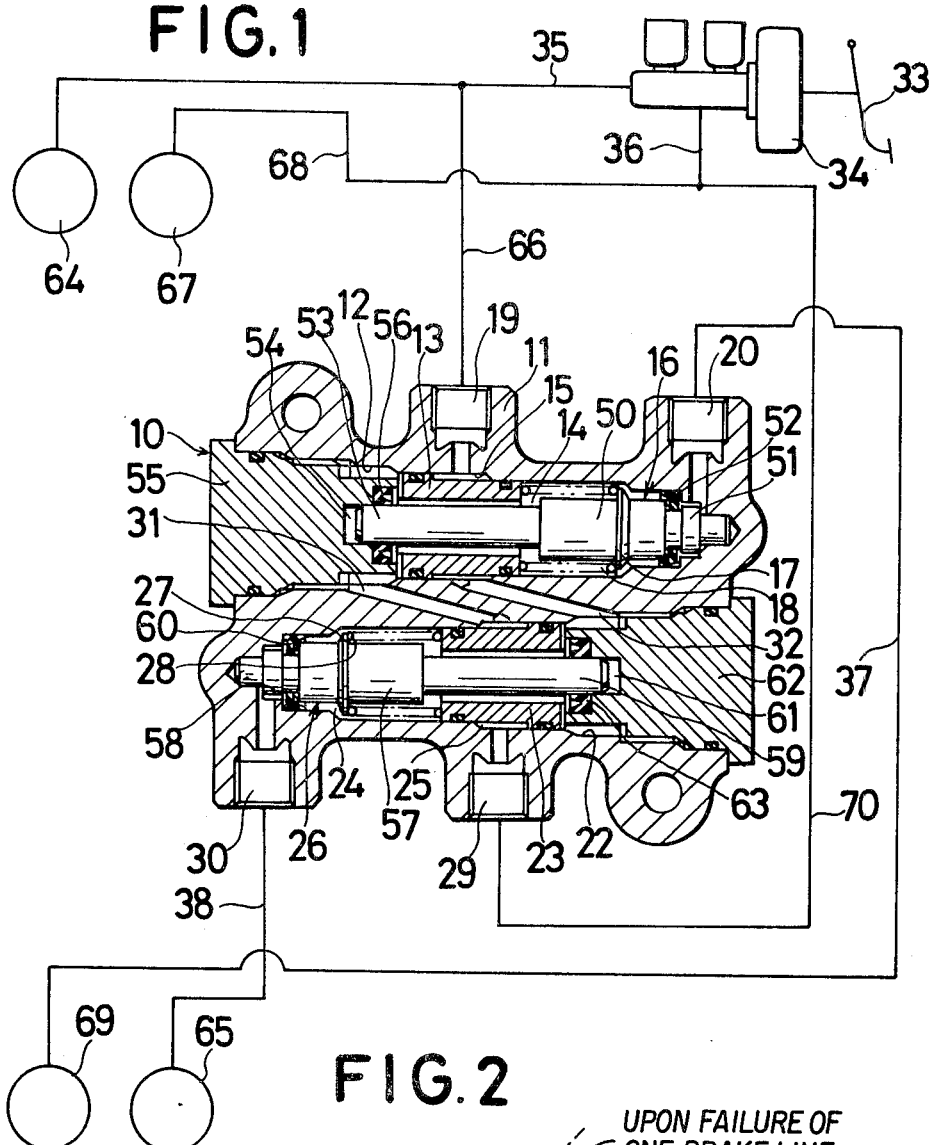
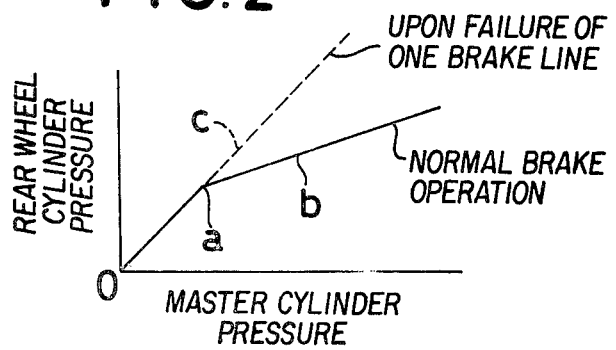

BRAKE PRESSURE CONTROL APPARATUS FOR SPLIT BRAKING SYSTEM

BACKGROUND OF THE INVENTION

1. Field of the Invention

This invention relates to a brake pressure control apparatus for a split braking system, and more particularly to a brake pressure control apparatus having two fluid pressure proportioning control valves for each of two braking fluid lines.

2. Description of the Prior Art

Conventionally, brake pressure control apparatuses have been proposed which include two fluid pressure proportioning control valves for a split braking system. Such fluid pressure proportioning control valves adapt so as to proportionally reduce increases in the output fluid pressure to increases in the magnitude of the input fluid pressure. In such prior brake pressure control apparatuses, one of proportioning control valves normally operate even when the other proportioning control valve fails to operate so that increases in the output fluid pressure relating to the one proportioning control valve still will be proportionally reduced. Thus sufficient braking fluid pressure will not be transmitted to the wheel cylinder.

SUMMARY OF THE INVENTION

An object of the present invention is, therefore, to provide an improved brake pressure control apparatus having two fluid pressure proportioning control valves for a split braking system which obviates the above-mentioned prior art drawbacks.

A further object of the present invention is to provide an improved brake pressure control apparatus having two fluid pressure proportioning control valves for a split braking system which assures application of considerable braking force even when one of the split braking system fails to operate.

A still further object of the present invention is to provide an improved brake pressure control apparatus having two fluid pressure proportioning control valves for a split braking system which is simple in construction.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, wherein:

FIG. 1 is a cross sectional view of a brake pressure control apparatus, with a split braking system schematically shown, according to the present invention, and FIG. 2 is a characteristic veiw of the braking pressures controlled by brake pressure proportioning control valves of the present invention.

DETAILED DESCRIPTION OF PREFERRED EMBODIMENT

Referring now to the drawings, particularly to FIG. 1 thereof, reference numeral 10 denotes a brake pressure control apparatus which includes a body 11. A first stepped cylindrical bore 12 is formed in the body 11 and a first sleeve 13 is slidably positioned within the bore 12. The first sleeve 13 divides the first cylindrical bore 12 into a first cylindrical fluid chamber 14 and a first annular fluid chamber 15. A first brake pressure proportioning control valve assembly 16 positioned within the first chamber 14 includes a stepped valve piston 50 which is urged into the opening direction by a first spring 18 interposed between a first piston-shoulder 17 and the first sleeve 13. The stepped valve piston 50 has a valve portion 51 thereon which adapts so as to cooperate with a seat member 52. A leftward extension 53 of the valve piston 50 extends through the sleeve 13 and is subjected to atmospheric pressure within an atmospheric chamber 54 which is defined by a plug 55 threaded through the body 11 and is sealingly separated from the chamber 14 by means of a seal 56. Thus, the valve piston 50 is urged to the left by means of the fluid pressure acting on the right portion of the valve piston 50.

The body 11 has a first inlet port 19 which is in continuous communication with the annular chamber 15 and also has a first outlet port 20 which is in selective communication with the cylindrical chamber 14 by means of the valving operation between the valve portion 51 and the seat member 52. The first sleeve 13 is maintained in its illustrated position as long as the brake fluid pressures prevail within both the cylindrical and annular chambers 14 and 15. When the predetermined brake fluid pressure is not transmitted to the first annular chamber 15, however, the sleeve 13 is caused to be moved to the right by the means of the brake fluid pressure within the cylindrical chamber 14 since the effective left end area of the sleeve 13 is larger than the effective right end area thereof.

A second cylindrical bore 22 is formed within the body 11 in parallel with the bore 12, and a second cylindrical fluid chamber 24 and a second annular fluid chamber 25 are formed within the bore 22 by an arrangement of a second slidable sleeve 23. Construction of a second brake pressure proportioning control valve assembly 26 which is disposed within the second cylindrical chamber 24 will be substantially the same as that of the first proportioning control valve assembly 16. Thus, the second proportioning control valve assembly 26 includes a stepped valve piston 57 having a valve portion 58 thereon and a rightward extension 59, and a seat member 60, the rightward extension 59 being subjected to atmospheric pressure within an atmospheric chamber 61 which is defined by a plug 62 and seal 63. The valve piston 57 is urged in its opening position by a second spring 28 inserted between the sleeve 23 and a piston-shoulder 27.

The body 11 has a second inlet port 29 which is in constant communication with the second annular chamber 25 and also has a second outlet port 30 which is in selective communication with the second cylindrical chamber 24 through means of the valving operation between the valve portion 58 and the seat member 60. The second annular chamber 25 is in fluidic communication with the first cylindrical chamber 14 through means of a first passage 31 provided in the body 11 while the second cylindrical chamber 24 is in fluidic communication with the first annular chamber 15 through means of a second passage 32 also provided in the body 11.

One brake fluid pressure generating chamber of a tandem master cylinder 34 operatively connected to a brake pedal 33 is directly connected to a left front wheel cylinder 64 via a conduit 35 at one side and is connected to a right rear wheel cylinder 65 through means of conduits 35 and 66, the brake pressure control apparatus 10 and a conduit 38 at the other side. The other of the tandem master cylinder 34 is directly connected to a right front wheel 67 via conduits 36 and 68 at one side and is connected to a left rear wheel cylinder 69 through means of conduits 36 and 70, the brake pressure control apparatus 10 and a conduit 37 at the other hand. Under normal conditions, the brake fluid pressures within both of the pressure generating chambers of the tandem master cylinder 34 would be equal to each other. Thus, the brake fluid pressures transmitted to the rear wheel cylinders 65 and 69 are increased along the line 0–a of FIG. 2.

When the brake fluid pressure within the second cylindrical chamber 24 from one of the master cylinder 34 reaches a predetermined value, the valve piston 57 is moved to the right against the spring 28 since the right end of the extension 59 is subjected to atmospheric pressure. Thus, the valve portion 58 is brought in contact with the seat 60 to thereby interrupt the fluid communication between the cylindrical chamber 24 and the outlet port 30. When the fluid pressure within the cylindrical chamber 24 in response to depressing force on the brake pedal 33 further increases, the valve piston 57 is moved or returned to the left by means of increased fluid pressure which now acts on the difference in effective annular area between the area defined by extension 59 and the area defined by the valving portion between valve portion 58 and seat 60. Thus, the valve portion 58 is again disengaged from the seat 60 to thereby re-establish the fluid communciation between the chamber 24 and the outlet port 30. Thereafter, the valve portion 58 is cyclically engaged with and disengaged from the seat 60 so that increases in the output fluid pressure will be proportionally reduced to increases in the magnitude of the input fluid pressure, as shown by the line a–b of FIG. 2.

During the above operation, the proportioning valve assembly 16 also functions in the same manner so that increase in the brake fluid pressure transmitted to the left rear wheel cylinder 69 will be proportionally reduced to increases in the master cylinder pressure, as shown by the line a–b of FIG. 2.

Under the above normal braking operation, the brake fluid pressures of the same magnitude prevail within the first annular chamber and first cylindrical chamber 15 and 14, respectively and the second annular chamber and second cylindrical chambers 25 and 24, respectively. Therefore, both sleeves 13 and 23 are maintained in their illustrated positions by means of springs 18 and 28, respectively.

Upon a failure of one braking system including the conduit 35, the first annular chamber 15 receives no brake fluid pressure. Accordingly, the sleeve 13 is caused to be moved to the right by means of the brake fluid pressure within the cylindrical chamber 14 which is connected to the other braking system including the conduit 36. The right end of the sleeve 13 is now in contact with the valve piston 50 to thereby prevent the leftward movement of the valve piston 50. Thus, the valve piston 50 is maintained in its illustrated position wherein the valve portion 51 is spaced from the seat 52, even when the master cylinder pressure relating to the other braking system exceeds the predetermined value. The master cylinder pressure is now directly transmitted to the left rear wheel cylinder 69 without any proportioning function of the first proportioning control valve 16, as shown in the line 0–a–c of FIG. 2.

When the other braking system including the conduit 36 fails to operate, the proportioning control valve assembly 26 is held in its non-operating position in the same manner so that the master cylinder pressure in the one braking system including conduit 35 is directly transmitted to the right rear wheel cylinder 65. Obviously, many modifications and variations of the present invention are possible in light of the above teachings. It is therefore to be understood that within the scope of the appended claims the invention may be practiced otherwise than as specifically described herein.

What is claimed is:

1. A brake pressure control apparatus for a split braking system having a tandem master cylinder including two pressure generating chambers and wheel cylinders, comprising:

a body having first and second inlet ports communicating with said tandem master cylinder and first and second outlet ports communicating with said wheel cylinders;

first and second stepped cylindrical bores formed in said body, respectively;

a first stepped sleeve member positioned within said first bore to thereby define a first annular chamber on the outer periphery thereof and a first cylindrical chamber therein, said first annular chamber receiving brake fluid pressure from one of the brake pressure generating chambers of said tandem master cylinder through said first inlet port, and said first cylindrical chamber communicating with one of said wheel cylinders through said first outlet port, a second stepped sleeve member positioned within said second bore to thereby define a second annular chamber on the outer periphery thereof and a second cylindrical chamber therein, said second annular chamber receiving brake fluid pressure from the other of the brake pressure generating chambers of said tandem master cylinder through said second inlet port, and said second cylindrical chamber communicating with the other of said wheel cylinders through said second outlet port;

said first cylindrical chamber communicating with said second annular chamber and said second cylindrical chamber communicating with said first annular chamber so that said first and second sleeve members are normally balanced by the brake fluid pressures from the brake pressure generating chambers of the tandem master cylinder, respectively;

a first brake pressure proportioning control valve assembly arranged within said first cylindrical chamber to thereby proportionally reduce increases in the brake fluid pressure within said first outlet port to increases in the brake fluid pressure within said second annular chamber, said first brake pressure proportioning control valve assembly being urged to its opening position by the movement of said first sleeve member when the braking pressure within said first annular chamber is less than the braking pressure within said first cylindrical member by a predetermined value so that said first cylindrical chamber is directly in communication with said first outlet port, and a second brake pressure proportioning control valve assembly arranged within said second cylindrical chamber to thereby proportionally reduce increases in the braking fluid pressure within said second outlet port to increases in the braking fluid pressure within said first annular chamber, said second brake pressure proportioning control valve assembly being urged to its opening position by the movement of said second sleeve member when the braking pressure within said second annular chamber is less than the braking pressure within said second cylindrical chamber by a predetermined value so that said second cylindrical chamber is directly in communication with said second outlet port.

2. A brake pressure control apparatus as set forth in claim 1, further comprising:
first and second spring means biasing said first and second brake pressure proportioning control valve assemblies to their opening positions, respectively, said first and second spring means also biasing said first and second sleeve members to their non-operating positions, respectively.

3. A brake pressure control apparatus as set forth in claim 1, wherein
said body further includes a first passage formed therein for connecting said second annular chamber to said first cylindrical chamber, and a second passage formed therein for connecting said first annular chamber to said second cylindrical chamber.

4. A brake pressure control apparatus for a split braking system having a tandem master cylinder including two pressure generating chambers and wheel cylinders, comprising:
a body having first and second inlet ports and first and second outlet ports communicating with said wheel cylinders;
first and second stepped cylindrical bores formed in said body, respectively;
a first stepped sleeve member positioned within said first bore to thereby define a first annular chamber and a first cylindrical chamber therein, said first annular chamber receiving brake fluid pressure from one of the brake pressure generating chambers of said tandem master cylinder through said first inlet port, and said first cylindrical chamber communicating with one of said wheel cylinders through said first outlet port;
a second stepped sleeve member positioned within said second bore to thereby define a second annular chamber and a second cylindrical chamber therein, said second annular chamber receiving brake fluid pressure from the other of the brake pressure generating chambers of said tandem master cylinder through said second inlet port, and said second cylindrical chamber communicating with the other of said wheel cylinders through said second outlet port;
said first cylindrical chamber communicating with said second annular chamber and said second cylindrical chamber communicating with said first annular chamber so that said first and second sleeve members are normally balanced by the brake fluid pressures from the brake pressure generating chambers of said tandem master cylinder, respectively;
a first brake pressure proportioning control valve assembly arranged within said first cylindrical chamber to thereby proportionally reduce increases in the brake fluid pressure within said first outlet port to increases in the brake fluid pressure within said second annular chamber, said first brake pressure proportioning control valve assembly being urged to its opening position by the movement of said first sleeve member when the braking pressure within said first annular chamber is less than the braking pressure within said first cylindrical chamber by a predetermined value so that said first cylindrical chamber is directly in communication with said first outlet port,
a second brake pressure proportioning control valve assembly arranged within said second cylindrical chamber to thereby proportionally reduce increases in the braking fluid pressure within said second outlet port to increases in the braking fluid pressure within the first annular chamber, said second brake pressure proportioning control valve assembly being urged to its opening position by the movement of said second sleeve member when the braking pressure within said second annular chamber is less than the braking pressure within said second cylindrical chamber by a predetermined value so that said second cylindrical chamber is directly in communication with said second outlet port, said wheel cylinders comprising a first, second, third and fourth wheel cylinder,
a first conduit interconnecting said one brake pressure generating chamber of said tandem master cylinder to said first wheel cylinder and to said first inlet,
a second conduit interconnecting the other brake pressure generating chamber of said tandem master cylinder to said second wheel cylinder and to said second inlet,
a third conduit interconnecting said first outlet with said third wheel cylinder; and
a fourth conduit interconnecting said second outlet with said fourth wheel cylinder.

5. A brake pressure control apparatus for a split braking system having a tandem master cylinder including two pressure generating chambers and wheel cylinders, comprising:
a body having first and second inlet ports communicating with said tandem master cylinder and first and second outlet ports communicating with said wheel cylinders;
first and second stepped cylindrical bores formed in said body, respectively;
a first stepped sleeve member positioned within said first bore to thereby define a first annular chamber and a first cylindrical chamber therein, said first annular chamber receiving brake fluid pressure from one of the brake pressure generating chambers of said tandem master cylinder through said first inlet port, and said first cylindrical chamber communicating with one of said wheel cylinders through said first outlet port;
a second stepped sleeve member positioned within said second bore to thereby define a second annular chamber and a second cylindrical chamber therein, said second annular chamber receiving brake fluid pressure from the other of the brake pressure generating chambers of said tandem master cylinder through said second inlet port, and said second cylindrical chamber communicating with the other of said wheel cylinders through said second outlet port;
said first cylindrical chamber communicating with said second annular chamber and said second cylindrical chamber communicating with said first annular chamber so that said first and second sleeve members are normally balanced by the brake fluid pressures from the brake pressure generating chambers of the tandem master cylinder, respectively;

a first brake pressure proportioning control valve assembly arranged within said first cylindrical chamber to thereby proportionally reduce increases in the brake fluid pressure within said first outlet port to increases in the brake fluid pressure within said second annular chamber, said first brake pressure proportioning control valve assembly being urged to its opening position by the movement of said first sleeve member when the braking pressure within said first annular chamber is less than the braking pressure within said first cylindrical chamber by a predetermined value so that said first cylindrical chamber is directly in communication with said first outlet port; and a second brake pressure proportioning control valve assembly arranged within said second cylindrical chamber to thereby proportionally reduce increases in the braking fluid pressure within said second outlet port to increases in the braking fluid pressure within said first annular chamber, said second brake pressure proportioning control valve assembly being urged to its opening position by the movement of said second sleeve member when the braking pressure within said second annular chamber is less than the braking pressure within said second cylindrical chamber by a predetermined value so that said second cylindrical chamber is directly in communication with said second outlet port wherein said first and second brake pressure proportioning control valve assemblies each include valve piston means positioned at end portions of said body and fixed plug members at opposite end portions of said body, each of said valve piston means and said plug members defining an atmospheric chamber therebetween.

6. A brake pressure control apparatus as set forth in claim 5, wherein each of said valve piston means and said plug members of each of said first and second brake pressure proportioning control valve assemblies are positioned at opposite end portions of said body.

* * * * *